United States Patent [19]

Hershberger et al.

[11] Patent Number: 4,868,895
[45] Date of Patent: Sep. 19, 1989

[54] OPTICAL DEVICE COPENSATOR

[75] Inventors: David L. Hershberger, Nevada City; Gordon E. Ransom, Grass Valley, both of Calif.

[73] Assignee: The Grass Valley Group, Inc., Nevada City, Calif.

[21] Appl. No.: 323,055

[22] Filed: Mar. 14, 1989

Related U.S. Application Data

[63] Continuation of Ser. No. 947,145, Dec. 29, 1986, abandoned.

[51] Int. Cl.⁴ .............................................. H04B 9/00
[52] U.S. Cl. ................................... 455/618; 455/600; 455/609; 455/613; 375/38
[58] Field of Search ............... 455/600, 606, 607, 609, 455/610, 613, 617, 618; 375/33, 36

[56] References Cited

U.S. PATENT DOCUMENTS

| | | | |
|---|---|---|---|
| 3,949,170 | 4/1976 | Shionoya | 375/38 |
| 4,053,713 | 11/1987 | Nitadori | 375/12 |
| 4,513,426 | 4/1985 | Jayant | 375/38 |
| 4,531,221 | 7/1985 | Chung et al. | 375/60 |
| 4,597,011 | 6/1986 | Baker | 375/12 |
| 4,615,038 | 9/1986 | Lim et al. | 375/12 |
| 4,631,486 | 12/1986 | Snell | 375/94 |
| 4,639,911 | 1/1987 | Roza et al. | 375/38 |
| 4,654,891 | 3/1987 | Smith | 455/613 |

OTHER PUBLICATIONS

*Radio Shack Dictionary of Electronics*, Rudolf Graf, Printed 1974, p. 443.

Primary Examiner—Robert L. Griffin
Assistant Examiner—Leslie Van Beek
Attorney, Agent, or Firm—Francis I. Gray

[57] ABSTRACT

An optical device compensator obtains from an input modulating signal an additive component and a multiplicative component. The additive and multiplicative components are combined with the input modulating signal to produce a compensated modulating signal which is applied to a driver for modulating an optical device.

6 Claims, 2 Drawing Sheets

OPTICAL DEVICE COPENSATOR

This is a Continuation of application of Ser. No. 947,145 filed Dec. 29, 1986 and now abandoned.

BACKGROUND OF THE INVENTION

The present invention relates to means for compensating for distortion, and more particularly to an optical device compensator for correcting distortions in an intensity modulated optical device.

Where wide bandwidth video signals are transmitted over a fiber optic link, intensity modulated (IM) systems are often used rather than square wave frequency modulated (FM) systems. While properly designed FM systems are essentially immune to amplitude nonlinearities of the optical transmitter and receiver devices, IM systems are directly affected by such nonlinearities. In addition to the simple nonlinear characteristics, optical devices also exhibit signal dependent nonlinearities. For example LED transmitters often have an optical efficiency which is a function of the average drive power, integrated over a time constant on the order of several hundred microseconds. As the average drive power increases, the efficiency, and therefore the optical power output, decreases. This produces dynamic gain variations as a function of the average picture level (APL) in video signals.

What is desired is an optical device compensator which reduces the dynamic gain variations caused by the variation of device output power as a function by the average drive power.

SUMMARY OF THE INVENTION

Accordingly the present invention provides an optical device compensator which derives from an input modulating signal an additive and a multiplicative component. The input signal is low pass filtered and a sample is added back into the input modulating signal for the additive component. The multiplicative component is derived by low pass filtering the input signal and adding a sample to a bias voltage, the resulting component being multiplied with the input modulating signal. The corrected modulating signal is applied to a driver for modulating the optical device.

The objects, advantages and novel features of the present invention will be apparent from the following detailed description when read in conjunction with the appended claims and attached drawing.

DESCRIPTION OF THE PREFERRED EMBODIMENT

Figure 1:
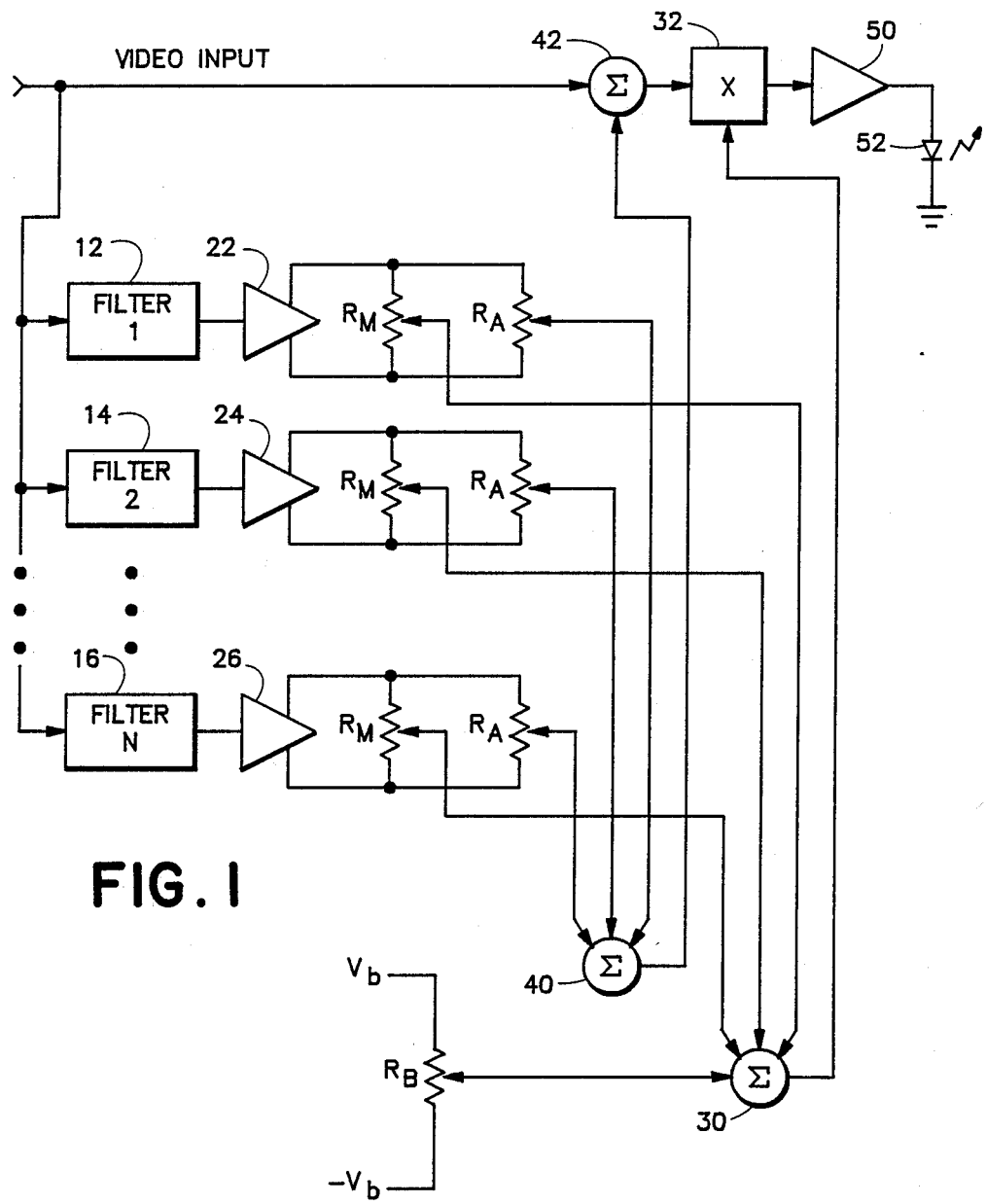
FIG. 1 is a general block for an optical compensator according to the present invention.

Referring now to FIG. 1 a video input modulating signal is input to a plurality of parallel filters 12, 14, 16. The filters 12, 14, 16 are usually simple, one or two pole, low pass filters. These filters may be either fixed or variable. Each filter output is buffered by a differential output amplifier 22, 24, 26 which allows for correction in either the positive or negative direction. Across the outputs of the amplifiers 22, 24, 25 are parallel potentiometers Rm, Ra by which desired samples of the respective filters 12, 14, 16 are obtained. Multiplicative correction samples are taken from the arms of the potentiometers Rm and Fed to a summation circuit 30 where they are combined with a bias voltage Vb obtained from the arm of a bias potentiometer Rb which can provide both positive and negative bias voltages. The output of the multiplication summing circuit 30 is input to a multiplier 32 to which is also input the video input signal. Additive correction samples are taken from the arms of the potentiometers Ra and fed to a summation circuit 40. The output of the addition summing circuit 40 is input to an adder 42 for combination with the video input signal. Since these correction signals are usually quite small, on the order of one dB or less, the order of addition and multiplication with the video input signal is unimportant, i.e., the order of addition and multiplication is interchangeable as indicated by the dotted elements 32', 42' of FIG. 1. The corrected video input signal is input to an optical device driver 50 which in turn intensity modulates an optical device 52.

Figure 2:
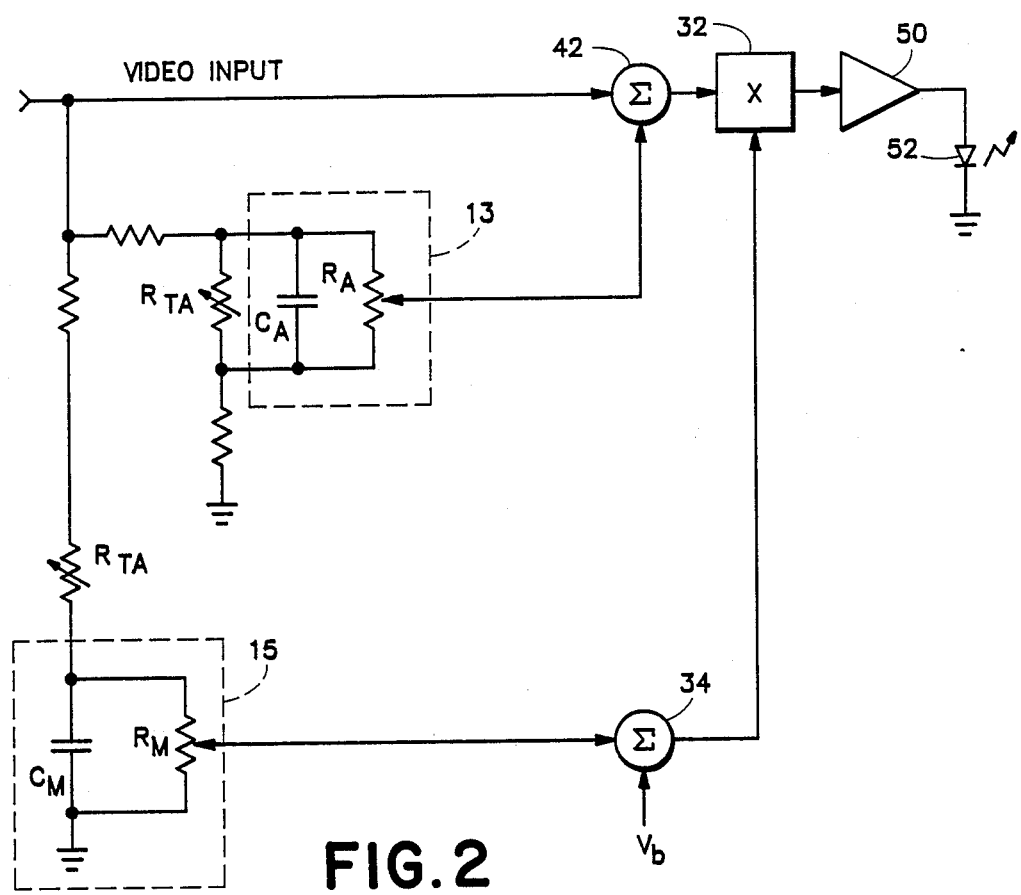
FIG. 2 is a block diagram for a specific implementation of an optical compensator according to the present invention.

For devices where the correction is unidirectional, such as optical devices whose efficiency decreases with increasing average power, FIG. 2 illustrates a simpler specific implementation. The video input signal is input to two low pass filter/potentiometer circuits 13, 15 having a capacitor Ca, Cm in parallel with the potentiometer Ra, Rm respectively. A sample of the input signal from potentiometer Ra provides the additive component which is added to the video input signal by the adder 42. A sample of the input signal from potentiometer Rm is combined with the bias voltage Vb in summer 34 to produce the multiplicative component which is multiplied with the video signal input by multiplier 32. The resulting compensated video input signal is input to the driver 50 to modulate the optical device 52. Time constant resistors Rta, Rtm are provided to make each low pass filter/potentiometercircuit 13, 15 adjustable to compensate for the long term distortion of the optical devices.

Thus the present invention provides means for compensating for nonlinearities in optical devices by providing an additive component and multiplicative component for combination with a video input modulating signal prior to input to a driver circuit which modulates the optical device.

What is claimed is:

1. An optical device compensator comprising:
   means for deriving a first component and a second component from an input signal; and
   means for combining the first component with the input signal to produce an intermediate compensated signal and for combining the intermediate compensated signal with the second component to produce a compensated signal, the compensated signal being used to modulate an optical device.

2. An optical device compensator as recited in claim 1where the deriving means comprises:
   a low pass filter to which the input signal is input;
   means for obtaining a first sample and a second sample from the output of the low pass filter, the first sample being the first component; and
   means for summing the second sample with a bias signal to produce the second component.

3. An optical device compensator as recited in claim 1 wherein the combining means comprises:
   means for adding the input signal and the first component to produce the intermediate compensated signal; and means for multiplying the intermediate compensated signal and the second component together to produce the compensated signal.

4. An optical device compensator as recited in claim 1 wherein the combining means comprises:
means for multiplying the input signal and the second component together to produce the intermediate compensated signal; and
means for adding the intermediate compensated signal and the first component to produce the compensated signal.

5. An optical device compensator as recited in claim 1 wherein the deriving means comprises:

a first low pass filter from which the first component is derived;
a second low pass filter from which a sample is derived; and
means for summing the sample with a bias signal to produce the second component.

6. An optical device compensator as recited in claim 1 wherein the deriving means comprises:
a plurality of low pass filters;
means for obtaining a first sample and a second sample from each of the low pass filters;
means for summing the first samples to produce the first component; and
means for summing the second samples and a bias signal to produce the second component.

* * * * *